United States Patent [19]
Atherton

[11] Patent Number: 6,046,736
[45] Date of Patent: Apr. 4, 2000

[54] SELF SCANNED AMORPHOUS SILICON INTEGRATED DISPLAY HAVING ACTIVE BUS AND REDUCED STRESS COLUMN DRIVERS

[75] Inventor: James Harold Atherton, Ringoes, N.J.

[73] Assignee: Sarnoff Corporation, Princeton, N.J.

[21] Appl. No.: 09/201,033

[22] Filed: Nov. 30, 1998

Related U.S. Application Data

[60] Provisional application No. 60/096,797, Aug. 17, 1998.

[51] Int. Cl.$^7$ ........................................................ G09G 5/00
[52] U.S. Cl. ............................ 345/211; 345/212; 345/100
[58] Field of Search .................................... 345/211, 100, 345/212, 98

[56] References Cited

U.S. PATENT DOCUMENTS

| | | | |
|---|---|---|---|
| 5,266,936 | 11/1993 | Saitoh | 345/98 |
| 5,317,401 | 5/1994 | Dupont et al. | 368/678 |
| 5,426,447 | 6/1995 | Lee | 345/103 |
| 5,555,001 | 9/1996 | Lee et al. | 345/93 |

*Primary Examiner*—Richard A. Hjerpe
*Assistant Examiner*—Marthe Y. Marc-Coleman
*Attorney, Agent, or Firm*—William J. Burke

[57] ABSTRACT

A Self Scanned Amorphous Silicon Integrated Display (SASID) uses one or more operational amplifiers in a differential amplifier configuration, to apply the ramp signal to the column drivers. The operational amplifiers are configured to receive the ramp signal at non-inverting input terminals and to apply the ramp signal to the data bus at respectively different locations. The operational amplifiers are also coupled to receive respective feedback signals at inverting input terminals. The feedback signals are taken from points on the bus that are distant from the point at which the amplifiers apply the ramp data signal to the bus. The display device includes a column driver having an initialization sequence in the vertical blanking interval. The signal used to render the column driver TFT conductive is determined in the vertical blanking interval and maintained on a capacitor in the column driver for the duration of the vertical field. The column driver also includes an autozero comparator which is subject to the autozero operation during the vertical blanking interval.

11 Claims, 6 Drawing Sheets

SELF SCANNED AMORPHOUS SILICON INTEGRATED DISPLAY HAVING ACTIVE BUS AND REDUCED STRESS COLUMN DRIVERS

This application claims the benefit of U.S. Provisional Application number 60/096,797 filed Aug. 17, 1998.

BACKGROUND OF THE INVENTION

The present invention is directed to self scanned amorphous silicon integrated displays and in particular to displays employing an active bus to distribute signals across the display and having a column driver which exhibits reduced voltage stress.

Active matrix liquid crystal displays generate images by altering the polarization of individual picture elements using a liquid crystal material. The picture elements (pixels) are arranged in rows and columns. Image data is loaded into the liquid crystal display one row at a time. The rows of pixels are sequentially scanned in order to form image frames.

Each pixel in an active matrix display includes a thin film transistor (TFT). The thin film transistor receives video data from a column driver on the display when the display row containing the pixel is selected. The TFT stores the received video data onto the capacitance of the pixel.

One material which may be used to form active matrix liquid crystal displays (LCDs) is amorphous silicon. This material has the advantage that it may be fabricated at relatively low temperatures.

Because the TFTs or the pixels are fabricated from amorphous silicon. It is desirable to implement the peripheral circuitry, for example, the line scanners and column drivers using TFTs. It is difficult to design circuitry with TFTs, however, because they exhibit threshold drift. Threshold drift is a phenomenon where the gate to source voltage needed to turn on the transistor changes over time. In amorphous silicon TFTs, threshold drift occurs when a TFT is driven at a high duty cycle. Another problem with amorphous silicon active matrix displays and particularly to active matrix displays which use a chopped ramp signal, is the sensitivity of the display to slight variations across the screen in the value of the ramp signal to activate the individual pixel elements (pixels) of the display. These variations typically occur due to resistance in the distribution bus which applies the ramp signal across the columns of the display.

U.S. Pat. No. 5,670,979 to Huq et al. entitled "Dataline Drivers with Common Reference Ramp Display" discloses a column driver implemented with amorphous silicon technology. The column driver disclosed in this patent includes circuitry which adjusts the drive voltage of certain ones of the transistors to accommodate for threshold drift in these transistors. The disclosed circuit, however, drives transistors at a relatively high duty cycle, and thus undesirably reduces the expected lifetime of these transistors.

SUMMARY OF THE INVENTION

The present invention is embodied in an active driver for a signal bus. The driver applies an input signal to a bus to compensate for resistive voltage drops across the bus. The driver includes a differential amplifier which is connected to receive the signal that drives the bus at its non-inverting input terminal and to receive a signal taken from the bus at a first location at its inverting input terminal. The output terminal is coupled to the bus at a second location, which is distant from the first location.

According to one aspect of the invention, the signal that drives the bus is a ramp signal.

According to another aspect of the invention, the signal that drives the bus is a reference signal.

According to yet another aspect of the invention, multiple buffer amplifier are used to apply the ramp signal to multiple points on the databus.

According to another aspect of the invention, the display device includes a column driver having an initialization sequence in the vertical blanking interval.

According to yet another aspect of the invention, the display device is an active matrix display including a thin-film transistor (TFT) which is connected to drive the column of the display device. The signal used to render the column driver TFT conductive is determined in the vertical blanking interval and maintained on a capacitor in the column driver for the length of the vertical field.

According to another aspect of the invention, the autozero operation on the comparator of the column driver is performed during the vertical blanking interval.

DETAILED DESCRIPTION

While the invention is described below in terms of an amorphous silicon active matrix display device, it is contemplated that it may be used more generally with any circuit that drives a signal bus. The signal applied to the bus may be a varying signal or a fixed reference signal.

Figure 1:
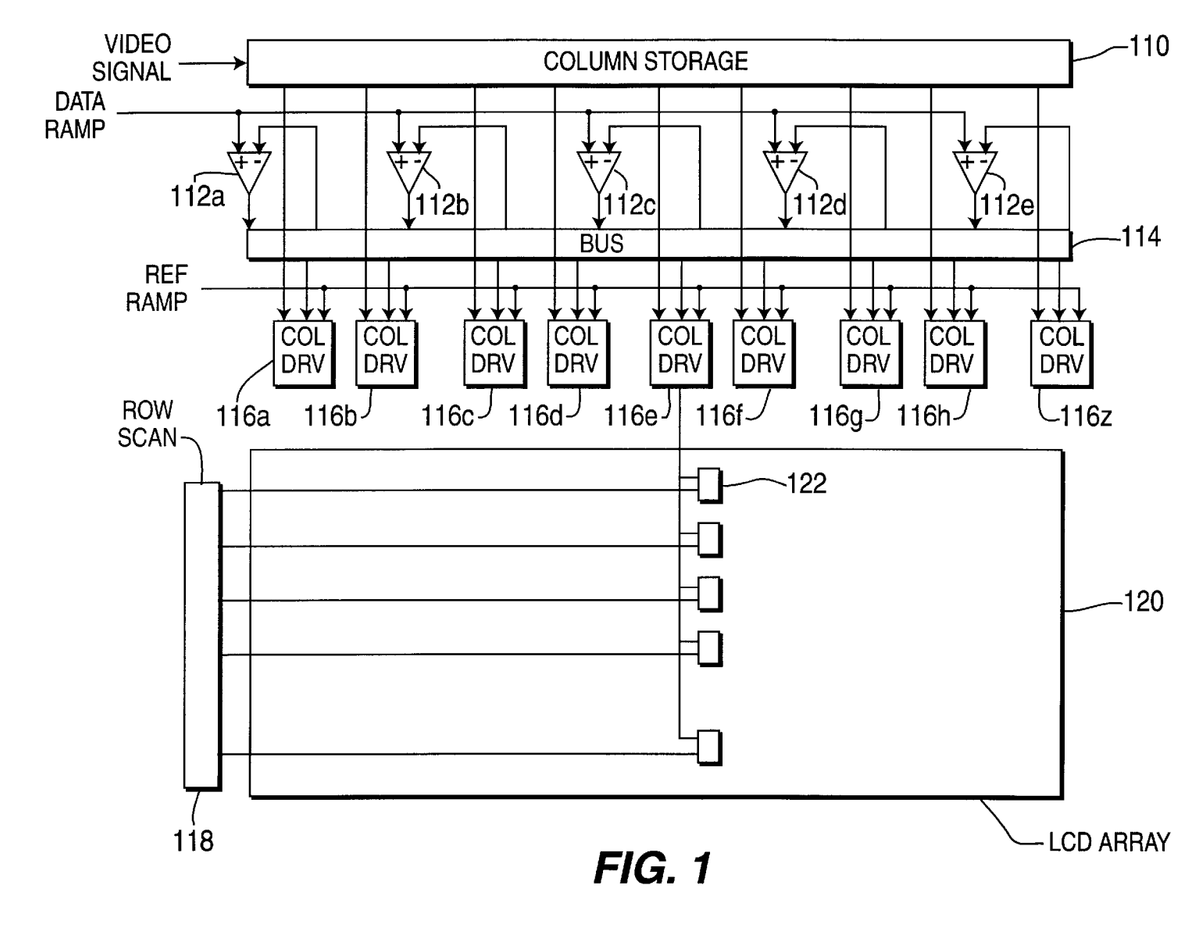
FIG. 1 is a block drawing of a SASID display according to the present invention.

FIG. 1 is a block diagram of a SASID display device according to the present invention. In the display device shown in FIG. 1, a video signal is applied to column storage circuitry 110. Circuitry 110 stores data values corresponding to each pixel on a line of the image. These data values are applied to the column drivers 116A through 116Z to drive a line of pixels on a selected row of the display device 120. In the exemplary embodiment of the invention, there is one column driver per column of the display device. The exemplary display device is an XGA display having, for example, 1,024 columns and 768 rows of pixels.

A data ramp signal is also applied to each of the column drivers 116A through 116Z. The data ramp is developed from a signal DATA RAMP applied to the non-inverting input terminals of operational amplifiers 112A, 112B, 112C, 112D, and 112E. Each of the operational amplifiers 112, is configured as a unity gain buffer, having a feedback signal applied to the inverting input terminal of the amplifier. The output signal of the amplifier is applied to a bus 114 at one location and the feedback signal is developed from the bus at a different location. As described below with reference to FIG. 3, this configuration produces less variation in the data ramp signal as it is applied to each of the column drivers than would be provided if the buffer amplifiers 112 were not used. The exemplary display device shown in FIG. 1 also applies a reference ramp signal to each of the column drivers 16A through 116Z.

While the reference ramp is shown as a simple bus, it is contemplated that it may be implemented as an active bus in the same manner as the data ramp bus 114.

In addition, as described below with reference to FIGS. 4 and 5, it may be desirable to use active busses to apply invariant signal reference voltages and power supply voltages to the circuitry shown in FIG. 1.

Each of the column drivers 16A through 116Z produces a potential which is applied to a respective image pixel, for example pixel 122 of the display device 120. Each image pixel includes a TFT (non shown) which is selectively activated by the row scan circuitry 118 to load the data signal provided by the column driver 116.

In the exemplary embodiment of the invention, the column driver applies a ramp signal to the pixel 122 and chops the ramp when predetermined conditions are met. Accordingly, the voltage used to determine the illumination level of the pixel is the ramp voltage at the time it was chopped.

Figure 2A:
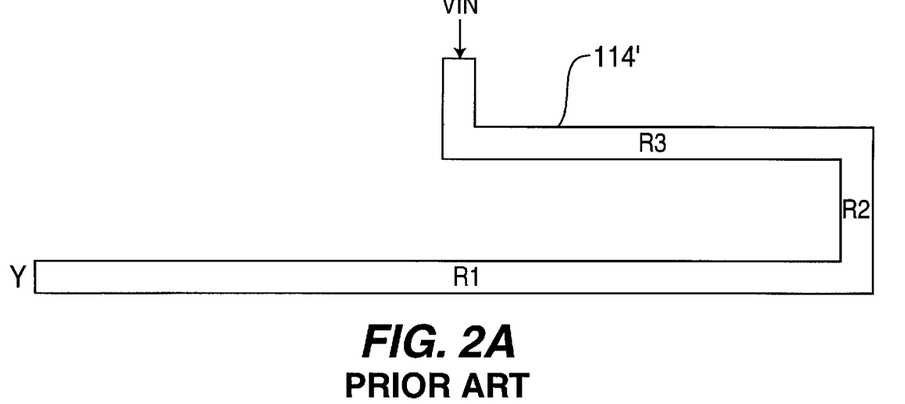
FIGS. 2A, 2B, and 2C are schematic diagrams which illustrate various implementations of bus distribution system in the prior art.
Figure 2B:
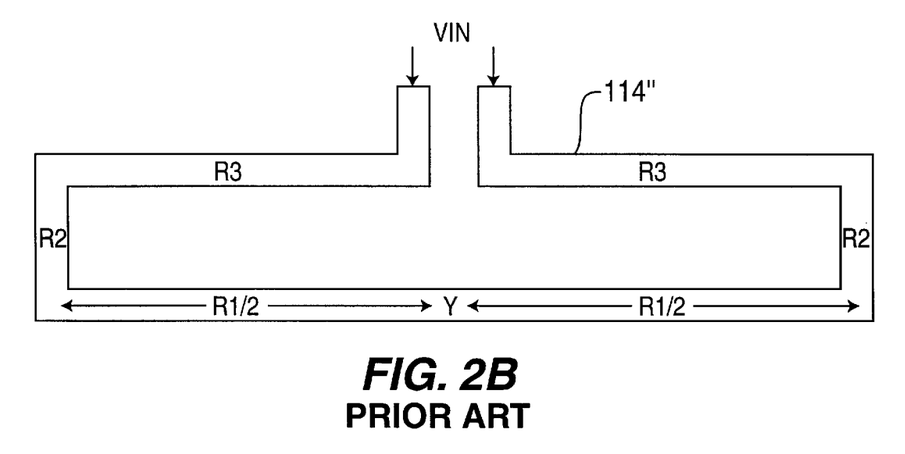
Figure 2C:
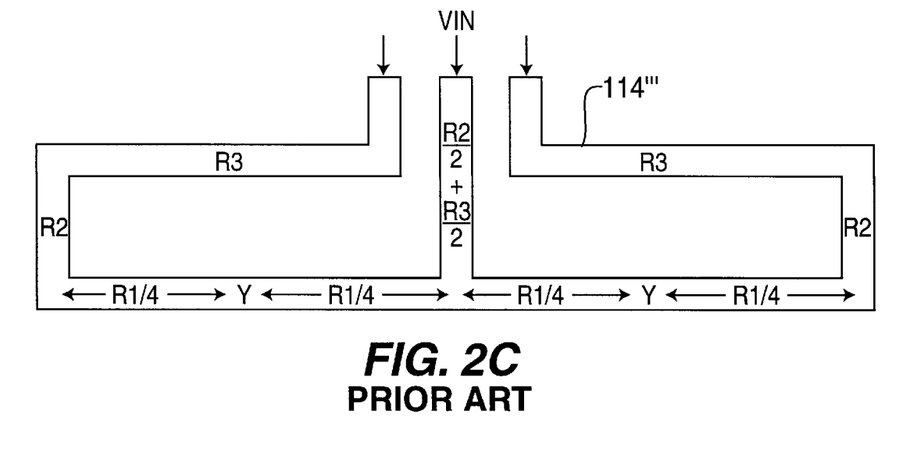

An XGA display includes 1,024 column drivers 116, each of which drives 768 pixels 122. Because the entire XGA display is updated every 16.7 MS, the total line time is approximately 16 microseconds. FIG. 2A is a drawing of a metal bus with resistance R as it may appear in a conventional flat panel display. The resistance of this bus is measured between the point at which an input signal (VIN) is applied and the point Y which is most distant from the point at which the input signal is applied. In the exemplary implementation shown in FIG. 2A, the total resistance of the bus, R, is the sum of the resistances R1, R2, and R3. FIG. 2B shows an exemplary layout which applies the signal VIN at either end of the bus thus reducing the resistance between the point at which the input signal is applied and the point Y which is farthest from those points. In the configuration shown in FIG. 2B, the resistance R is equal to ½(R½+R2+R3). A final exemplary layout for the bus 114 is shown in FIG. 2C. According to this layout, the signal VIN is applied at 3 points: at the two ends of the bus and at the middle of the bus. The resistance between the points where the signal VIN is applied and the points Y which are farthest from the points of which the signal VIN is applied in FIG. 2C is R=½(R¼+R2+R3).

Figure 3:
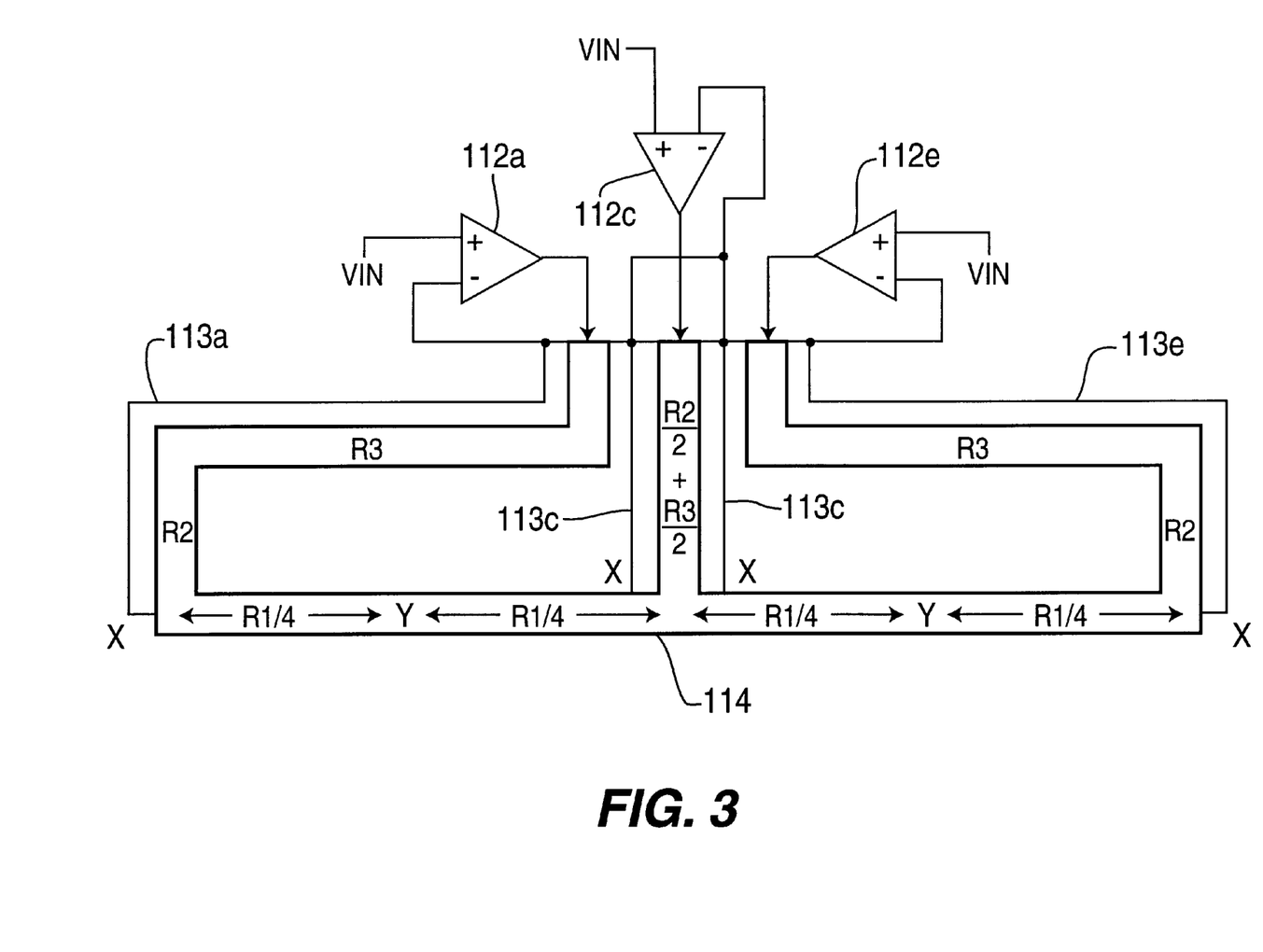
FIG. 3 is a schematic diagram which illustrates a bus distribution system according to the present invention.

FIG. 3 is a schematic diagram of an exemplary embodiment of the invention which enhances the bus layout structure shown in FIG. 2C by adding the operational amplifiers 112A, 112C, and 112E. Each of the amplifiers has an output terminal and two high-impedance input terminals, an inverting input terminal and a non-inverting input terminal. The amplifiers 112 receive the signal DATA RAMP at their non-inverting input terminals and apply there output signals at respectively different location on the bus 114. Three sense lines 113A, 113C, and 113E are added to the layout and serve as inputs to the inverting terminals of three amplifiers 112A, 112C and 112E respectively. The input signal, VIN, is connected to the non-inverting terminals of all three amplifiers. In this configuration, each of the amplifiers 112 produces an output voltage sufficient to equalize the voltages applied to its inverting and non-inverting input terminals. Due to the high impedance of the inverting input terminal, essentially no current flows through the sense lines 113. Accordingly, in the configuration shown in FIG. 3, the amplifiers112A, 112C and 112E apply a voltage to the bus that is appropriate to cause the potential at the points X to be equal to VIN. This substantially eliminates any voltage drop across the resistances R2 and R3. Thus, the effective resistance between the output terminals of the amplifiers and the points Y is approximately R⅛.

It is noted that the layouts shown in FIGS. 2A and 2B could also benefit from using the present invention. By introducing one or two sense lines and amplifiers as required. In addition, the bus 114 may be partitioned more finely than is shown in FIG. 3. For example, as shown in FIG. 1, the data ramp bus 114 may be partitioned into 5 sections, each having a respective operational amplifier 112.

The active bus architecture described above may be applied generally to any electronic circuit including a bus which desirably has a uniform signal level across the bus. The subject invention is especially advantageous when used with buses that are driven at relatively high current levels. As these buses typically exhibit a higher IR potential difference from point to point along the bus than busses which are driven at lower current levels.

In the exemplary embodiment of the invention, the active bus apparatus is used to distribute a data ramp signal which exhibits a change in potential over time as a linear ramp. For the invention to operate advantageously, it is desirable for the slew rate of the operational amplifiers 112 to be greater than the rate of change of the signal being distributed over the bus.

As described above, the amount of time allowed to store data values into a line of the LCD 120 is approximately 16 microseconds. In this time, potential values stored in the capacitance of each LCD cell of the line are dissipated and new potentials are established. Due to the relatively short amount of time to perform these operations, it is advantageous for the data ramp signal to be active for the longest amount of time possible during the 16 microseconds. According to one aspect of the present invention, the initialization of the column driver circuitry 116 of the display device 120 is modified so that it occurs during the vertical blanking interval rather than during the horizontal line interval.

Figure 4:
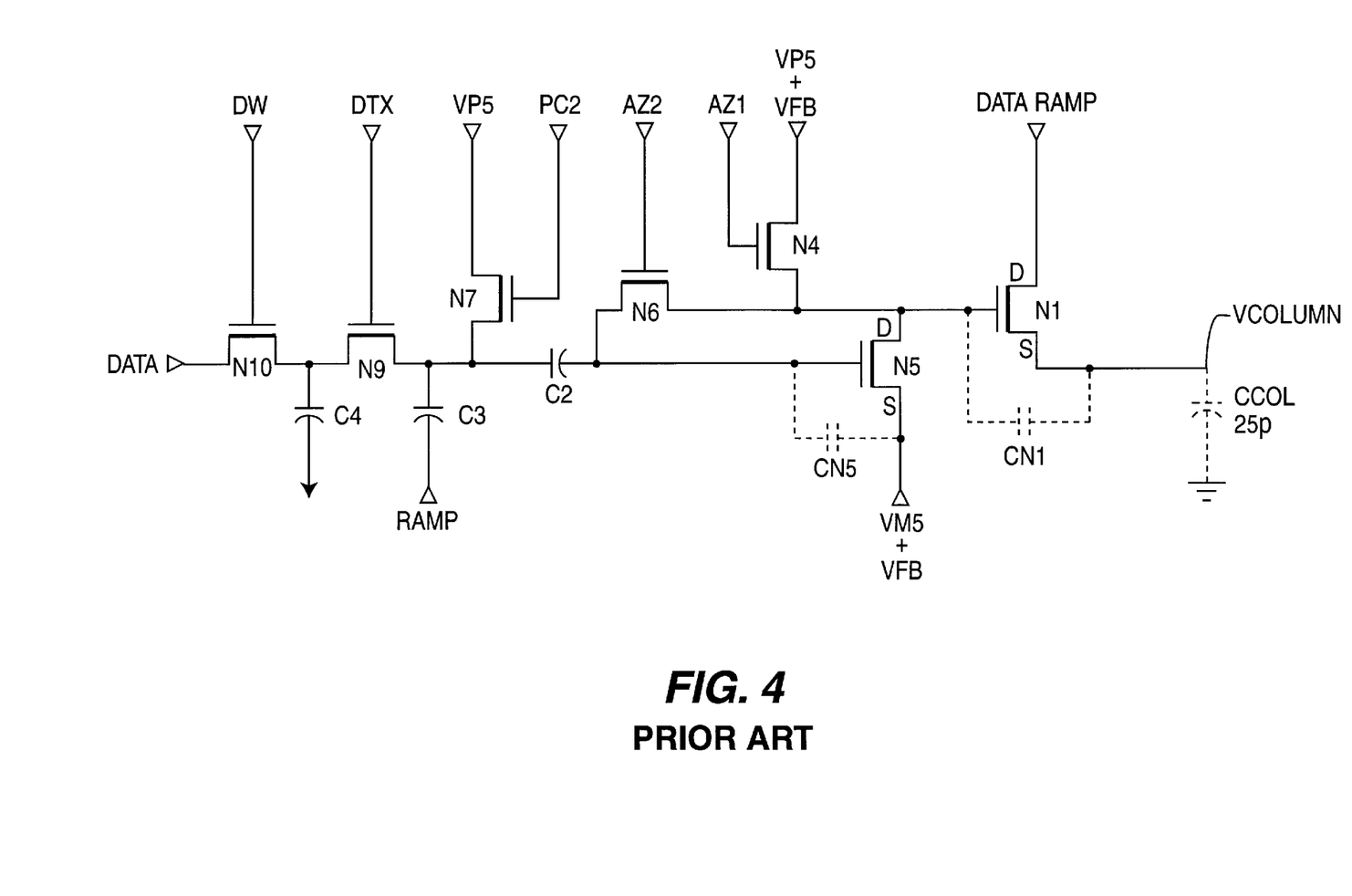
FIG. 4 is a schematic diagram of a conventional amorphous silicon column driver.

FIG. 4 is a schematic diagram of a prior art column driver circuit similar to that described in the above referenced patent to Huq et al. The column drivers shown in FIGS. 4 and 5 include features which are not illustrated in the drawing figures. In particular, data signals are loaded into the column drivers in a two step pipeline. During the time at which the column driver is transferring data to a pixel of line N in the display device 120 for display, the corresponding pixel data for line N+1 is being loaded into the column driver and particularly on to capacitor C4. After line N has been loaded into the pixels 122 of the LCD 120, the data for line N+1 in each of the column drivers is transferred from capacitor C4 to capacitor C3 responsive to the signal DTX. The description of the column driver set forth below does not address the transfer of data from the column storage element 110 into the column drivers 116 via the transistor N10 and data write pulse, DW. Instead, this description begins at the start of the horizontal line period in which the data to be loaded into the array has previously been stored onto the capacitor C4.

Figure 5:
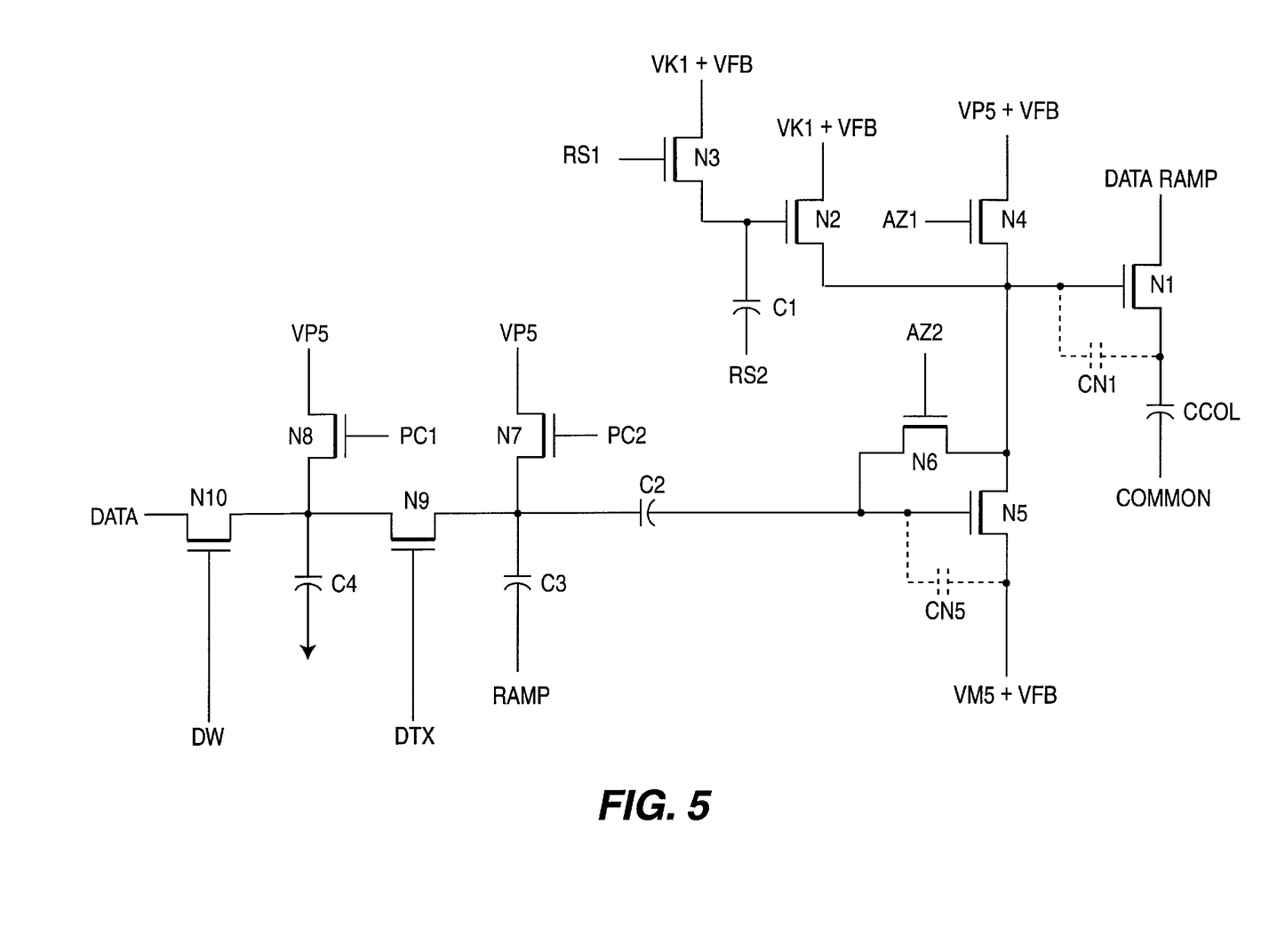
FIG. 5 is a schematic diagram of a column driver circuit according to the present invention.

The column drivers shown in FIGS. 4 and 5 also include a feature by which gate voltages applied to certain of the TFT's are adjusted to compensate for threshold drift. The compensating signal is indicated in FIGS. 4 and 5 as VFB. This signal may be developed, for example, by subjecting a dummy TFT to the current and driving potentials of, for example, the transistor N1. The response of the dummy transistor may be monitored by feedback circuitry (not shown) to determine the driving voltage needed by the dummy transistor to produce the desired output current. The feedback circuit adjusts the driving voltage by an amount, VFB, to compensate for drift in the threshold voltage of the TFT. This adjustment potential is then applied to other TFT's in the display device which may be subject to threshold drift.

FIG. 4 is described with reference to the timing diagram shown in FIG. 6. The column driver shown in FIG. 4 is inactive between time T0 and time T1, the row deselect interval. At time T1, signal AZ1 becomes logic high, turning on transistor N4 and applying a voltage VP5 (e.g. +5 volts)+VFB to the gate electrode of transistor N1. This pulse of the signal AZ1 establishes a potential of VP5+VFB across capacitor CN1 which represents the gate to source capacitance of the transistor N1. Next, at time T2, the signal AZ1 becomes logic low and the signal AZ2 becomes logic high. Signal AZ2 turns on transistor N6 which connects the drain electrode of transistor N5 to its gate electrode. Due to the potential stored on capacitor CN1, this pulse of the signal AZ2 turns on transistor N5 allowing the potential stored on capacitor CN1 to drain to the supply voltage level VM5 (e.g. −5 volts)+VFB. When the charge across capacitor CN1 dissipates to just below the potential needed to turn on transistor N5, transistor N5 is rendered non-conductive.

In the exemplary embodiment of the invention, the signal VM5+VFB is applied to all of the column drivers across the display. This voltage is a key component of the comparison operation performed by transistor N5. Accordingly, any variation in this voltage across the display may affect the displayed image. Consequently, it is contemplated that the voltage VM5+VFB maybe distributed to the various column drivers using the active bus technique described above with reference to FIG. 3.

This operation of pulse AZ2 autozeros the comparator, represented by transistor N5, by establishing a potential across capacitor CN5 (the gate to source capacitance of transistor N5) which is substantially equal to the gate to source threshold potential of transistor N5. This operation removes this threshold potential from the comparison operation performed by the transistor N5 when data values are written into the pixels 122 of the display device 120.

Also between times T2 and T3, the signal PC2 becomes logic high connecting capacitor C3 to the potential VP5 through transistor N7. This pulse initializes capacitor C3 at the largest possible pixel potential. This operation conditions the capacitor C3 to accept the data value stored on capacitor C4. Signals AZ2 and PC2 are activated at the same time in order to remove any charge from capacitor C2, the coupling capacitor between capacitor C3 and the gate electrode of transistor N5 while capacitor C3 is charged to the VP5 potential. At time T3, both the signals AZ1 and DTX become logic high. The signal DTX connects capacitor C4 to capacitor C3, causing the potential stored on capacitor C3 to be reduced in proportion by the pixel data potential stored on capacitor C4. Thus, at time T4, when signal DTX becomes logic low, the difference between the potential VP5 and the potential stored on capacitor C3 is proportional to the data value which had previously been stored on capacitor C4.

At time T3, when signal AZ1 again becomes logic high, the gate electrode of transistor N1 is charged to the VP5+ VFB potential, which turns on the transistor N1. At time T3, the value of the data ramp signal is at a reference potential (e.g. ground) and any charge which had been stored on the capacitance of the selected pixel 122 is dissipated through transistor N1.

At time T5, the charge on the pixel capacitance has been dissipated and signal AZ1 becomes logic low. Next, at time T6, both of the signals RAMP and DATA RAMP begin to increase. Due to the potential stored across capacitor CN1 between times T3 and T5 responsive to the signal AZ1, transistor N1 remains conductive as the data ramp signal is applied to the capacitance of the pixel 122. The signal RAMP is added to the potential stored on capacitor C3 and the sum of these potentials is applied to the coupling capacitor C2.

The sums of the signal RAMP, the potential across capacitor C3 and the potential across capacitor C2 represent a potential which is applied to the gate electrode of transistor N5. As this potential rises above the threshold potential of transistor N5, the transistor is turned on, dissipating the charge stored at the gate electrode of transistor N1. As this charge dissipates, transistor N1 is turned off. The potential stored on the capacitance of the pixel 122 is held at the value of the signal DATA RAMP when transistor N1 is turned off.

The prior art column driver initializes the potential across capacitors CN1 and CN5 during each line interval. Thus, transistors N4 and N6 are subject to a duty cycle which includes one pulse per line of the image.

To improve the expected life times of transistors N4 and N6 it is desirable to reduce their duty cycle. In addition, it would be advantageous for the operation of the column driver, especially for a high resolution display device, if the portion of the line time used to store image data into the pixel cells 122 could be increased.

FIG. 5 is a schematic diagram of a column driver according to the present invention which achieves these goals. FIG. 5 is described with reference to the timing diagram shown in FIG. 7.

The circuitry shown in FIG. 5 has been modified relative to the circuitry shown in FIG. 4 to activate transistor N4 only during the vertical blanking interval. In addition, transistors N2 and N3 and capacitor C1 have been added to apply the potential which turns on transistor N1 prior to the start of the comparison operation. The gate voltage applied to transistor N2 has been compensated via the feedback voltage VFB to track any threshold drift of transistor N2.

Figure 7:
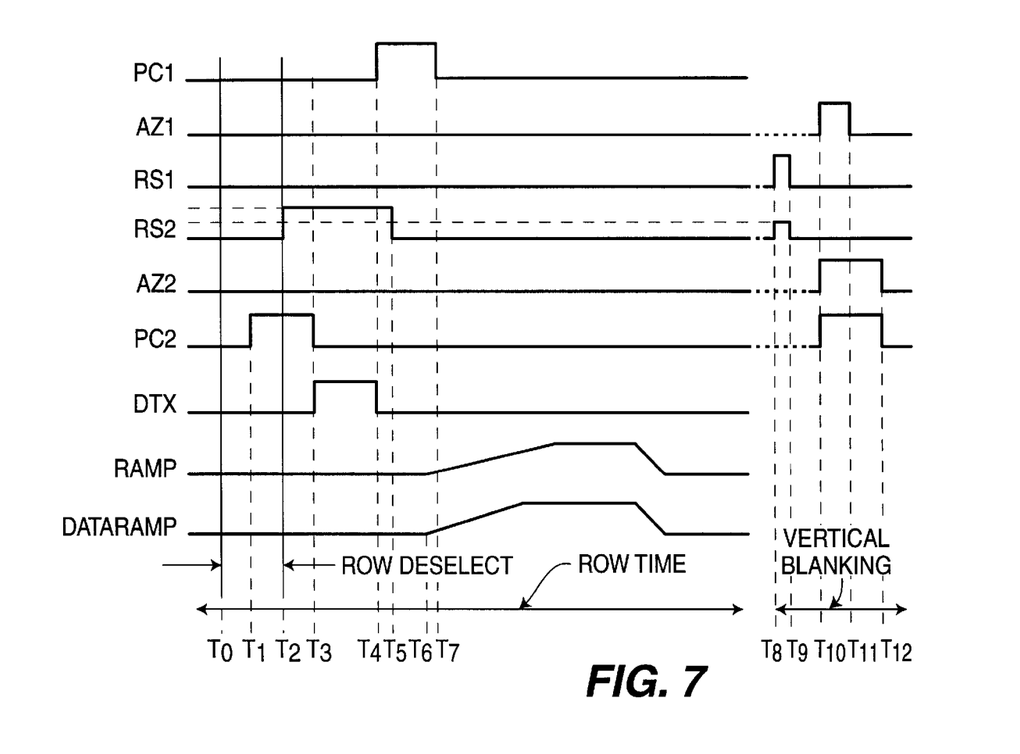
FIG. 7 is a timing diagram which is useful for describing the operation of the column driver circuit shown in FIG. 5.

With reference to FIG. 7, the circuitry shown in FIG. 5 operates as follows. During the vertical blanking interval, at time T8, signals RS1 becomes logic high and RS2 transitions from a logic-low voltage, $V_0$, to a voltage $V_1$ which is less than the logic-high voltage, $V_2$. Signal RS1 gates the potential VK1 (e.g. 18 volts)+VFB onto the capacitor C1 while signal RS2 holds the lower plate of the capacitor at $V_1$ potential. This initializes the voltage at capacitor C1.

At time T9, both of the signals RS1 and RS2 become logic low. After time T9, capacitor C1 holds a bias potential substantially equal to the potential VK1+VFB minus $V_1$, the potential of the signal RS2 between times T8 and T9. This potential is insufficient to turn on transistor N2 when RS2 is logic low ($V_0$). During operation of the display device, transistor N2 may be turned on by applying a logic-high signal RS2 as described below.

Next, at time T10, the signals AZ1, AZ2 and PC2 become logic high. The signal PC2 turns on transistor N7, erasing any residual charge stored on capacitor C3 as described above. At the same time, signal AZ1 turns on transistor N4 applying the potential VP5 plus VFB to the gate electrode of transistor N1 and to the junction of the source electrode of transistor N6 and the drain electrode of transistor N5. The logic high signal AZ2 applied to transistor N6 turns this transistor on causing it to apply the signal VP5+VFB to the gate electrode of transistor N5, thus turning on transistor N5.

At time T11, the signal AZ1 becomes logic low while the signals AZ2 and PC2 remain logic high. When the signal AZ1 becomes logic low, transistor N4 turns off and the potential applied to the gate electrode of transistor N1 is dissipated through transistor N5, until this potential, as applied to the gate electrode of transistor N5, reaches a level just below the gate to source threshold potential of transistor N5. Because the signals PC2 and AZ2 are logic high at the same time, any charge stored across capacitor C2 is also dissipated during this interval, while capacitor C3 is charged to the VP5 potential.

This operation of the signals AZ1, RS2 and AZ2, establishes the reference potential across Transistor N5 which autozeros the comparator of the column driver shown in FIG. 5. In the exemplary embodiment of the invention, the capacitance CN5 is sufficient to maintain this autozero potential through the entire frame time. Thus, the autozero operation may be performed on a frame basis only and does not need to be performed each line time, as in the conventional line driver shown in FIG. 4.

The line operations of the column driver shown in FIG. 5 begin at time T1, during the row deselect. At time T1, the signal PC2 becomes logic high applying the signal VP5 to capacitor C3, while the signal RAMP is at the reference potential. As described above, this operation erases any stored charge that may exist on capacitor C3 from the prior storage operation. At time T2, the signal RS2 becomes logic high. When RS2 becomes logic-high the potential, V2, applied to the capacitor C1 plus the potential stored on the capacitor C1 causes the potential at the gate electrode of transistor N2 to turn the transistor on thereby applying the potential VK1+VFB to the gate electrode of transistor N1. During the time T2 through T5, the signal RS2 is held logic high, turning on transistor N1 and allowing any charge on the capacitance of pixel 221 to dissipate to the signal DATA RAMP which, during this interval, is at the reference potential.

At time T3, the signal PC2 becomes logic low and the signal DTX becomes logic high allowing the charge stored on capacitor C4 to be transferred onto capacitor C3 as described above. At time T4, the signal DTX becomes logic low turning off transistor N9 and breaking the connection between capacitors C3 and C4. Thus, after time T4, the difference between the potential VP5 and the potential across capacitor C3 is proportional to the potential across capacitor C4.

Once the data on capacitor C4 has been transferred to capacitor C3, the signal PC1 becomes logic high applying the potential VP5 to capacitor C4 and thus erasing any data charge that previously had been stored on the capacitor. This step is done prior to storing new input data onto capacitor C4 as described above.

At time T5, the signal RS2 becomes logic low. At this time, any charge stored on the capacitance of the pixel 122 has been dissipated and the potential VK1+VFB has been stored on the capacitance CN1, allowing transistor N1 to remain turned on after signal RS2 becomes logic low. At time T6, the signals RAMP and DATA RAMP begin increasing in value. As the signal RAMP increases, the combined potential represented by the signal RAMP, the pixel data value stored on capacitor C3, and any potential stored across capacitor C2 is applied to the gate electrode of transistor N5. As this potential increases above its gate to source threshold potential, transistor N5 is turned on, dissipating the charge stored across capacitor CN1 and turning off transistor N1. As described above, the time at which transistor N1 is turned off determines the potential stored on the capacitance of the pixel 221.

Figure 6:
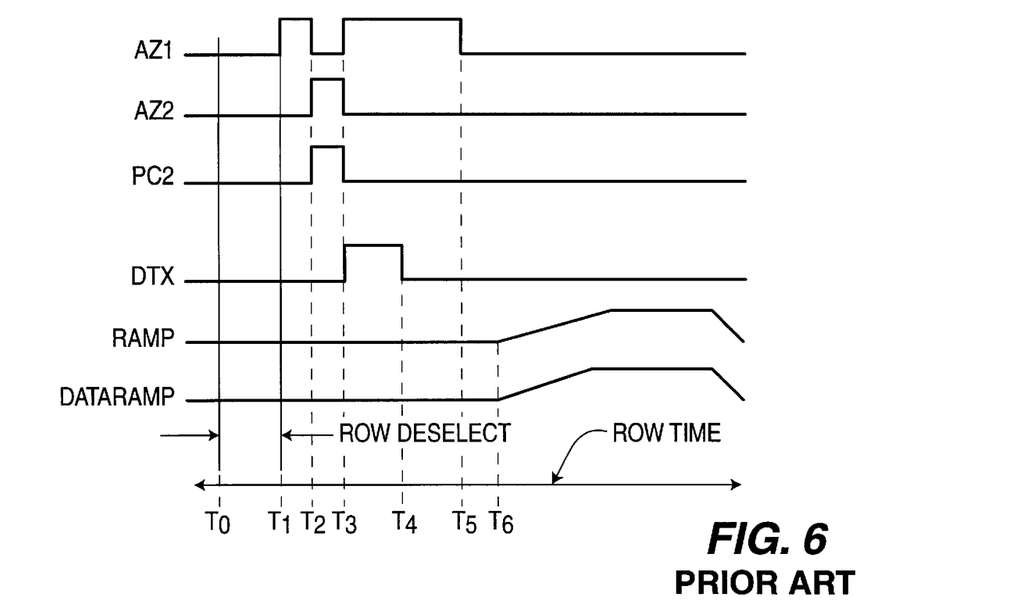
FIG. 6 is a timing diagram which is useful for describing the operation of the column driver shown in FIG. 4.

It is noted that at time T5 in both FIG. 6 and FIG. 7, the initialization operations that are performed in the line time are complete and the comparison operation may begin. Time T5 in FIG. 7, however, is considerably earlier in the line time than T5 in FIG. 6. This allows a longer portion of the line time for the comparison operation to occur. This is especially important when the circuitry shown in FIG. 5 is used with a high-resolution display such as the XGA type display device of the exemplary embodiment of the invention, because this device has a relatively short line time (e.g. 16 microseconds). In addition, it is noted that the duty cycle of transistor N4 has been greatly reduced in the embodiment of the invention shown in FIG. 5 as signal AZ1 is active only during the vertical blanking interval. Furthermore, it is noted that transistor N2 has been compensated for threshold drift by application of the signal VK1+VFB via transistor N3, which is also active only during the vertical blanking interval. Thus the column driver circuitry shown in FIG. 5, in addition to being more suitable for use in a high resolution display device also exhibits less voltage stress and, so, a longer lifetime than the prior art circuitry shown in FIG. 4.

While the invention has been described in terms of an exemplary embodiment, it is contemplated that it may be practiced as outlined above within the scope of the appended claims.

The invention claimed is:

1. Apparatus for applying an input signal to a bus to compensate for resistive voltage drops across the bus, the apparatus comprising:

a differential amplifier having an output terminal, an inverting input terminal and a non-inverting input terminal, the output terminal of the amplifier being connected to the bus and the non-inverting input terminal of the amplifier being coupled to receive the input signal; and a conductive sense line having first and second ends, the first end being connected to the inverting input terminal of the amplifier and the second end being connected to the bus at a location on the bus which is distant from the connection between the output terminal of the amplifier and the bus.

2. Apparatus according to claim 1, wherein the signal is a time-varying signal which changes at a predetermined rate and the amplifier has a slew rate which is greater than the rate of change of the signal.

3. Apparatus according to claim 2, wherein the Apparatus is a column bus driver in an amorphous silicon active matrix liquid crystal display device and the signal is a data ramp signal.

4. Apparatus according to claim 2, wherein the Apparatus is a comparator in an active matrix display device and the signal is a reference potential that is applied to the comparator.

5. Apparatus according claim 1, wherein the bus has first and second ends and the output terminal of the differential amplifier is connected to the bus at the first end, the apparatus further including a further differential amplifier having an output terminal, an inverting input terminal and a non-inverting input terminal, the output terminal of the further amplifier being connected to the bus at the second end, the non-inverting input terminal of the further amplifier being coupled to receive the input signal; and a further conductive sense line having first and second ends, the first end of the sense line being connected to the inverting input terminal of the further amplifier and the second end of the sense line being connected to the bus at a location on the bus which is distant from the connection between the output terminal of the further amplifier and the bus.

6. A method for applying an input signal to a bus to compensate for resistive voltage drops across the bus, the method comprising the steps of:

applying the input signal to the bus at a first location on the bus via a differential amplifier; and applying a feedback signal from the bus to the differential amplifier, the feedback signal being taken from a second location on the bus which is distant from the first location, wherein the feedback signal causes the differential amplifier to temporarily increase, in level, the signal applied at the first location to match the feedback signal to the input signal.

7. A method according to claim 6, wherein the bus has first and second ends and the differential amplifier applies the input signal to the bus at the first end, the method further including the steps of:

applying the input signal to third location at the second end of the bus via a further differential amplifier; and applying a further feedback signal from the bus to the further differential amplifier, the feedback signal being taken from a fourth location on the bus which is distant from the second and third locations, wherein the further feedback signal causes the further differential amplifier to temporarily increase, in level, the signal applied to the third location to match the further feedback signal to the input signal.

8. A method for driving a column of a display device with a data signal wherein the display device displays a video signal having video fields separated by respective vertical blanking intervals, the method comprising the steps of:

providing an input pixel value;

selectively applying a first ramp signal to the column of the display device responsive to a control signal;

comparing, in a comparator, the input pixel value to a second ramp signal to generate the control signal to cause the first ramp signal to cease to be applied to the column of the display device when the second ramp signal exceeds the input pixel value, including the steps of:

applying a signal which autozeros the comparator;

storing the autozero signal in the comparator;

wherein the step of autozeroing the comparator is performed during the vertical blanking interval and the autozero signal is stored for a field interval.

9. Apparatus for applying an input signal to a bus to compensate for resistive voltage drops across the bus, the apparatus comprising:

differential amplifier means for applying the input signal to the bus at a first location on the bus; and means for applying a feedback signal from the bus to the differential amplifier means, the feedback signal being taken from a second location on the bus which is distant from the first location, wherein the feedback signal causes the differential amplifier means to temporarily increase, in level, the signal applied at the first location to match the feedback signal to the input signal.

10. Apparatus according to claim 9, wherein the bus has first and second ends and the differential amplifier means applies the input signal to the bus at the first end, the apparatus further including:

further differential amplifier means for applying the input signal to third location at the second end of the bus; and means for applying a further feedback signal from the bus to the further differential amplifier means, the feedback signal being taken from a fourth location on the bus which is distant from the second and third locations, wherein the further feedback signal causes the further differential amplifier means to temporarily increase, in level, the signal applied to the third location to match the further feedback signal to the input signal.

11. Apparatus for driving a column of a display device with a data signal wherein the display device displays a video signal having video fields separated by respective vertical blanking intervals, the apparatus comprising:

means for providing an input pixel value;

means for selectively applying a first ramp signal to the column of the display device responsive to a control signal;

comparator means for comparing the input pixel value to a second ramp signal to generate the control signal to cause the first ramp signal to cease to be applied to the column of the display device when the second ramp signal exceeds the input pixel value, the comparator means including:

means for autozeroing the comparator by applying an autozero signal during the vertical blanking interval;

means for storing the autozero signal in the comparator for one field interval.

* * * * *